(12) United States Patent
Chen

(10) Patent No.: US 7,070,197 B2
(45) Date of Patent: Jul. 4, 2006

(54) BABY CARRIAGE CHASSIS ADAPTED TO SUPPORT A BABY'S CAR SEAT THEREON

(75) Inventor: Shun-Min Chen, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 114 days.

(21) Appl. No.: 10/926,677

(22) Filed: Aug. 26, 2004

(65) Prior Publication Data

US 2005/0242535 A1    Nov. 3, 2005

(30) Foreign Application Priority Data

Apr. 30, 2004   (CN) .................... 2004 2 00424570

(51) Int. Cl.
  *B62B 1/00*   (2006.01)
  *A47C 1/08*   (2006.01)
  *B60N 2/02*   (2006.01)

(52) U.S. Cl. .............. 280/642; 280/643; 280/641; 297/256.16; 297/354.1

(58) Field of Classification Search .............. 280/642, 280/641, 643; 297/256.16 X, 354.12 X, 297/354.1
See application file for complete search history.

(56) References Cited

U.S. PATENT DOCUMENTS

| | | | | |
|---|---|---|---|---|
| 4,678,196 A | * | 7/1987 | Van Steenburg | 280/47.41 |
| 4,736,959 A | * | 4/1988 | Van Steenburg | 280/30 |
| 5,499,831 A | * | 3/1996 | Worth et al. | 280/30 |
| 5,863,097 A | * | 1/1999 | Harper et al. | 297/260.2 |
| 6,174,028 B1 | * | 1/2001 | Yang et al. | 297/258.1 |
| 6,530,591 B1 | * | 3/2003 | Huang | 280/650 |
| 6,561,577 B1 | * | 5/2003 | Kelly | 297/183.2 |
| 6,793,280 B1 | * | 9/2004 | Washizuka et al. | 297/130 |
| 6,854,758 B1 | * | 2/2005 | Hou et al. | 280/642 |
| 6,983,986 B1 | * | 1/2006 | Jane Santamaria | 297/130 |

FOREIGN PATENT DOCUMENTS

| | | | | |
|---|---|---|---|---|
| GB | 2163478 A | * | 2/1986 | |
| GB | 2392887 A | * | 3/2004 | |

* cited by examiner

*Primary Examiner*—Christopher P. Ellis
*Assistant Examiner*—Gerald B Klebe
(74) *Attorney, Agent, or Firm*—The Webb Law Firm

(57) ABSTRACT

A baby carriage chassis includes a pair of rear rods, a pair of front rods, a pair of seat rods, each of which interconnects an adjacent pair of the front and rear rods, a pair of supporting protrusions protruding transversely and respectively from the front rods in opposite directions, and a backrest pivotable relative to the seat rods between a first angular position, in which the backrest extends rearwardly and upwardly from the seat rods, and a second angular position, in which the backrest extends frontwardly and upwardly from the seat rods and intersects the front rods to define a V-shaped space for accommodating a baby's car seat therein and for permitting mounting of a front retaining portion of the baby's car seat on a top end of the backrest and mounting of a rear retaining portion of the baby's car seat on the supporting protrusions.

5 Claims, 4 Drawing Sheets

BABY CARRIAGE CHASSIS ADAPTED TO SUPPORT A BABY'S CAR SEAT THEREON

CROSS-REFERENCE TO RELATED APPLICATION

This application claims priority of Chinese Application No. 2004200424570, filed on Apr. 30, 2004.

BACKGROUND OF THE INVENTION

1. Field of the Invention

This invention relates to a baby carriage chassis, more particularly to a baby carriage chassis with a chassis frame that is provided with supporting protrusions which cooperate with a backrest to support a baby's car seat thereon.

2. Description of the Related Art

UK Patent Application GB 2,392,887 A discloses a baby carriage chassis that includes a main frame and a seat holder mounted on the main frame for supporting a baby's car seat thereon. The seat holder includes a pair of support frames pivotally connected to the main frame for angular movement relative to the main frame. One of the support frames is pivotable relative to the other of the support frames between a first angular position, in which the support frames are substantially co-planar with each other so as to serve as a backrest for supporting a baby's back when the chassis is used without the baby's car seat, and a second angular position, in which the support frames are extended into a V-shape to accommodate and support front and rear retaining portions of the baby's car seat.

The aforesaid conventional baby carriage chassis is disadvantageous in that the structure of the seat holder is complicated, and the assembly thereof is laborious, which results in an increase in manufacturing costs.

SUMMARY OF THE INVENTION

The object of the present invention is to provide a baby carriage chassis that is capable of overcoming the aforesaid drawbacks associated with the prior art.

According to this invention, there is provided a baby carriage chassis that is adapted to support a baby's car seat thereon. The baby's car seat has front and rear retaining portions. The baby carriage chassis comprises: a pair of opposing rear rods; a pair of opposing front rods, each of which is disposed frontwardly of and is aligned with a respective one of the rear rods; a pair of opposing seat rods, each of which interconnects an adjacent pair of the front and rear rods; a pair of opposing supporting protrusions disposed above the seat rods and protruding transversely and respectively from the front rods in opposite directions; and a backrest having a top end and pivoted to the seat rods so as to be pivotable relative to the seat rods between a first angular position, in which the backrest extends rearwardly and upwardly from the seat rods, and a second angular position, in which the backrest extends frontwardly and upwardly from the seat rods and intersects the front rods to define a V-shaped space for accommodating the baby's car seat therein and for permitting mounting of the front retaining portion of the baby's car seat on the top end of the backrest and mounting of the rear retaining portion of the baby's car seat on the supporting protrusions.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
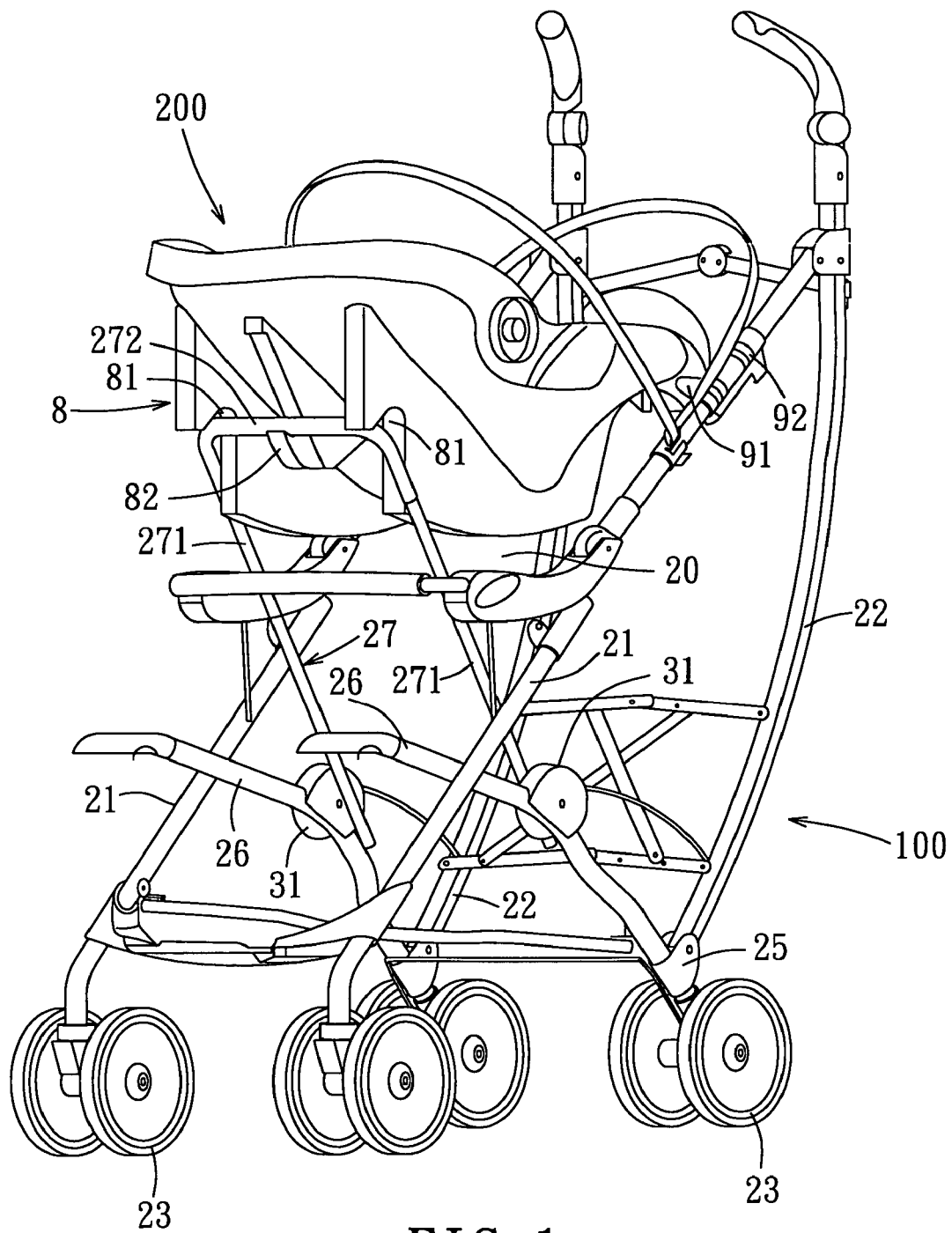
FIG. 1 is a perspective view of the preferred embodiment of a baby carriage chassis according to this invention, with a baby's car seat supported thereon.

FIGS. 1 to 5 illustrate the preferred embodiment of a baby carriage chassis 100 for supporting a baby's carseat 200 thereon according to the present invention. The baby's car seat 200 has front and rear retaining portions 8, 91.

The baby carriage chassis 100 includes: a pair of opposing rear rods 22; a pair of opposing front rods 21, each of which is disposed frontwardly of and is aligned with a respective one of the rear rods 22; a pair of opposing seat rods 26, each of which interconnects an adjacent pair of the front and rear rods 21, 22; a pair of opposing supporting protrusions 922 disposed above the seat rods 26 and protruding transversely and respectively from the front rods 21 in opposite directions; and a backrest 27 having a top end 272 and pivoted to the seat rods 26 so as to be pivotable relative to the seat rods 26 between a first angular position (see FIG. 2), in which the backrest 27 extends rearwardly and upwardly from the seat rods 26, and a second angular position (see FIG. 2, indicated by the dashed lines), in which the backrest 27 extends frontwardly and upwardly from the seat rods 26 and intersects the front rods 21 to define a V-shaped space 20 for accommodating the baby's car seat 200 therein and for permitting mounting of the front retaining portion 8 of the baby's car seat 200 on the top end 272 of the backrest 27 and mounting of the rear retaining portion 91 of the baby's carseat 200 on the supporting protrusions 922. A plurality of wheels 23 are connected to bottom ends of the front rods 21 and bottom ends of the seat rods 26.

Figure 2:
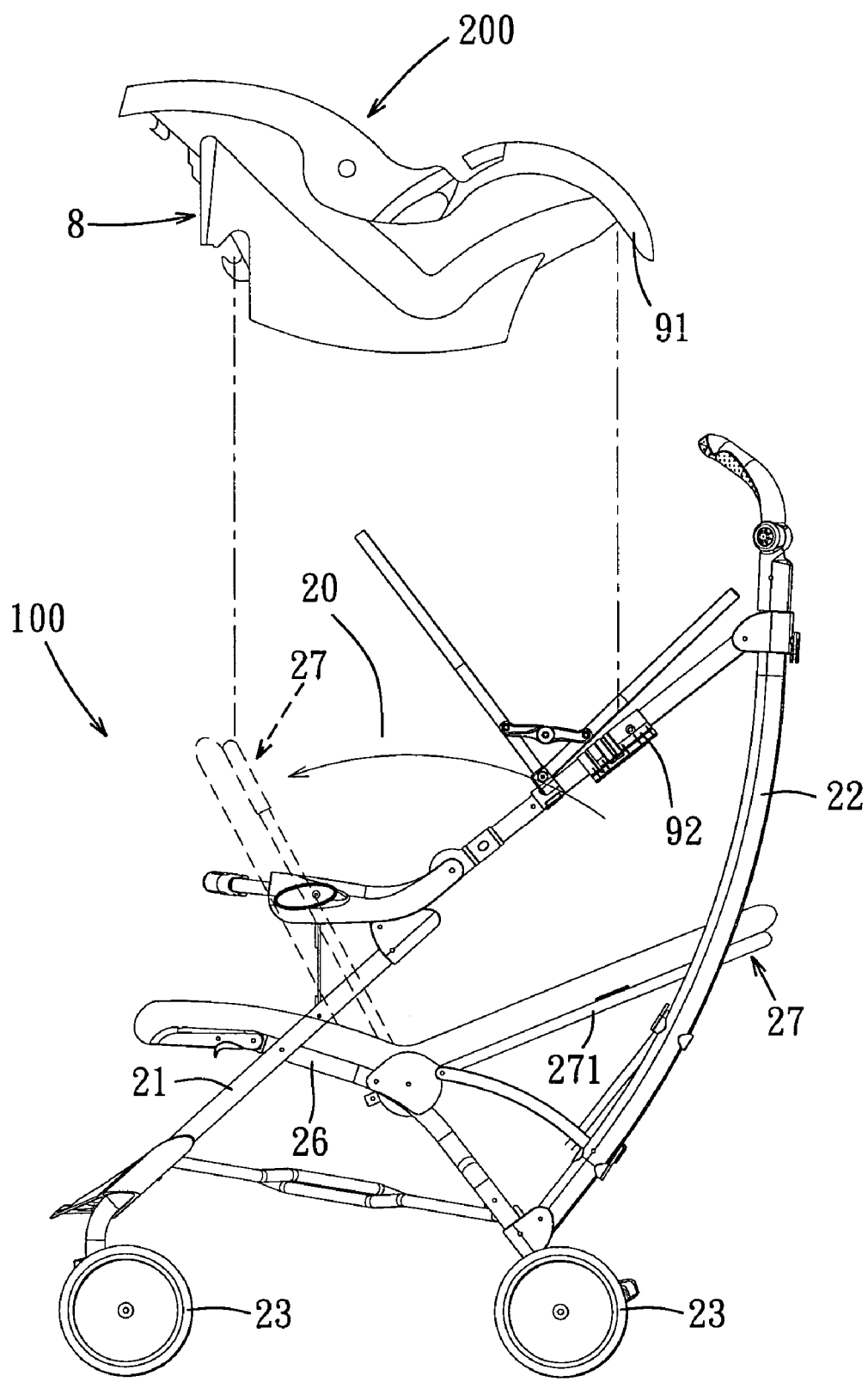
FIG. 2 is a side view to illustrate how a backrest of the preferred embodiment is pivoted from a first angular position to a second angular position.
Figure 3:
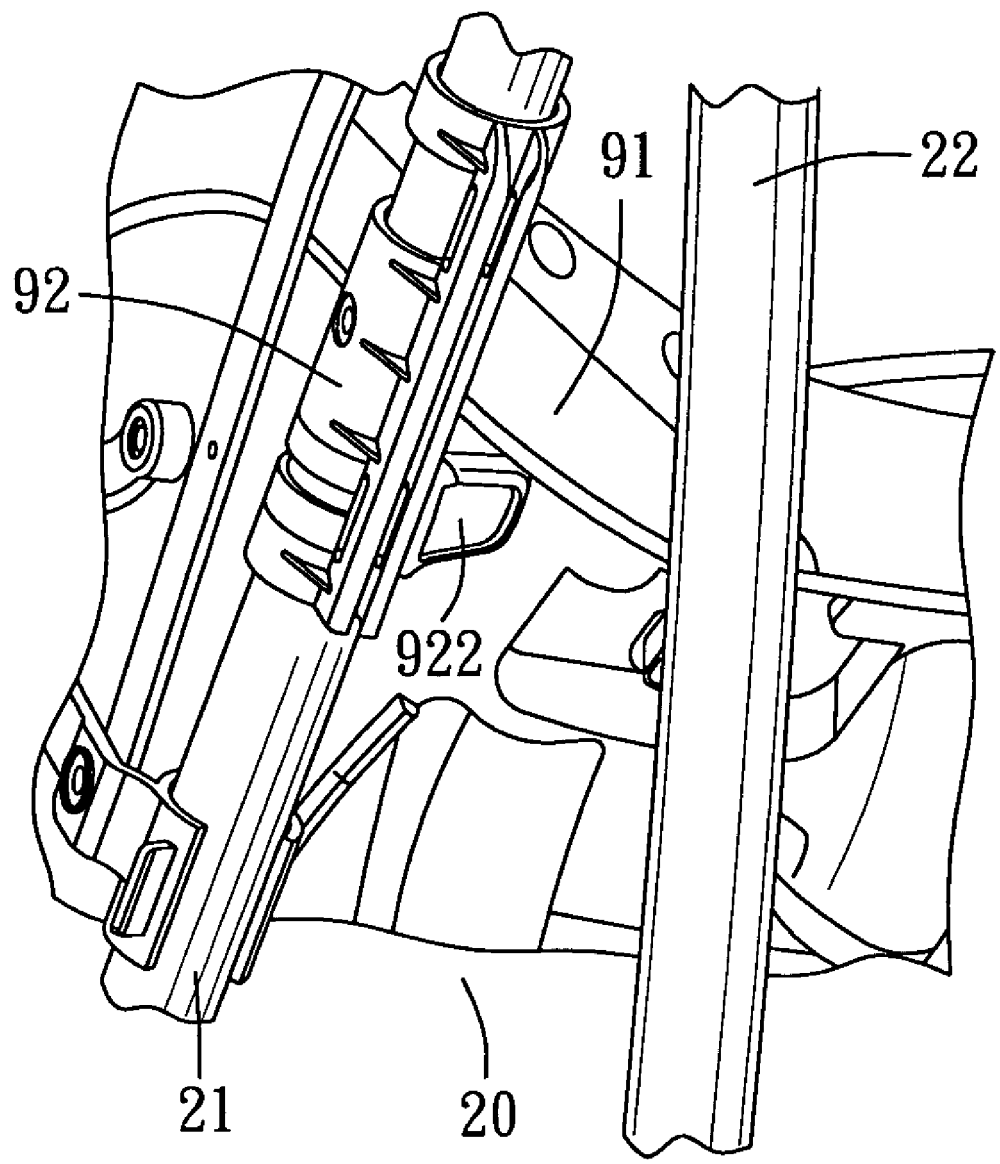
FIG. 3 is a fragmentary perspective view to illustrate how a rear retaining portion of the baby's car seat is supported on a supporting protrusion of the preferred embodiment.
Figure 4:
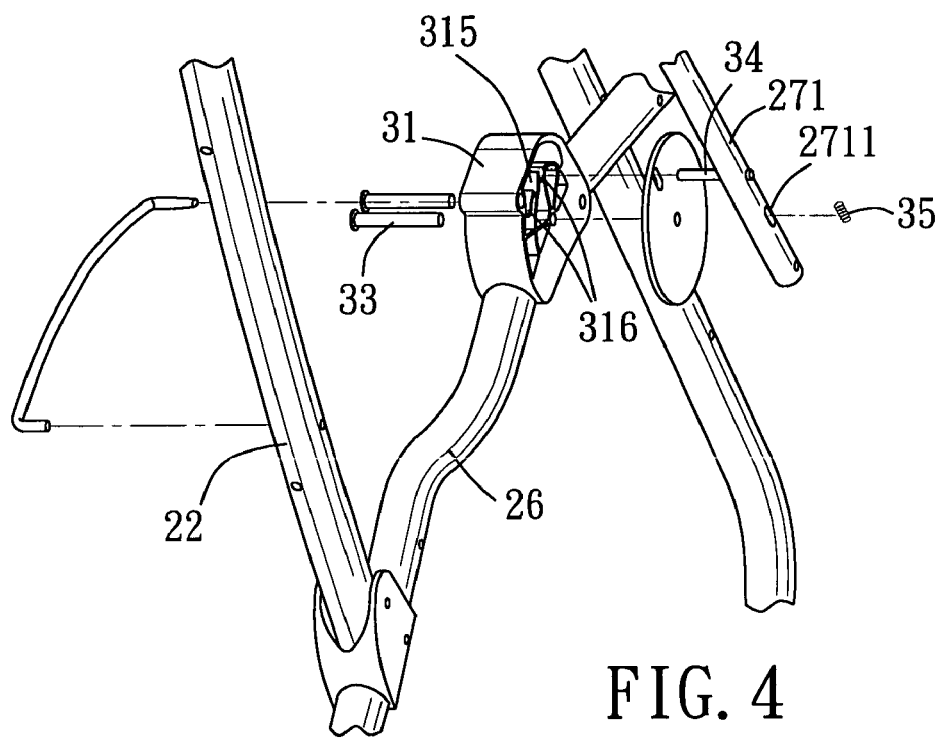
FIG. 4 is a fragmentary exploded perspective view to illustrate how the backrest is adjusted through a backrest adjusting unit of the preferred embodiment.
Figure 5:
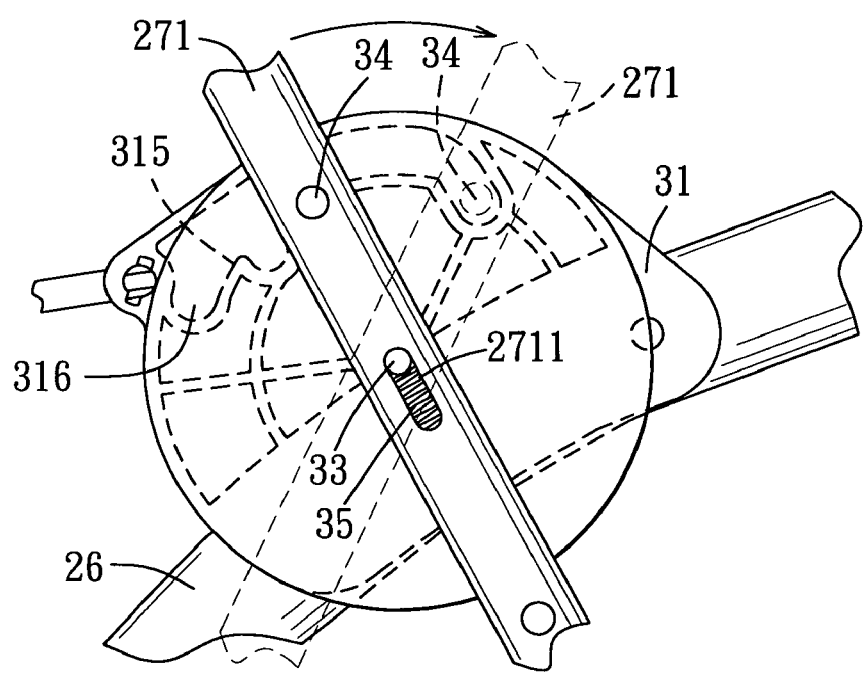
FIG. 5 is a fragmentary side view to illustrate how the backrest engages a selected one of retaining grooves in a retaining member of the backrest adjusting unit of FIG. 4.

In this embodiment, a pair of opposing sleeves 92 (only one is shown in FIGS. 1 to 3) are sleeved securely and respectively on the front rods 21. The supporting protrusions 922 are fixed to and protrude respectively from the sleeves 92 into the V-shaped space 20.

A pair of pivot seats 31 are respectively mounted on the seat rods 26. The backrest 27 is pivoted to the pivot seats 31, and includes two opposing side tubes 271, each of which extends upwardly and inclinedly from a respective one of the pivot seats 31 and each of which is formed with an elongated slot 2711.

The baby carriage chassis 100 further includes a backrest adjusting unit including: a pair of connecting pins 33, each of which extends through a respective one of the pivot seats 31 and the slot 2711 in a respective one of the side tubes 271 so as to permit pivoting of the backrest 27 to the pivot seats 31 and so as to permit movement of the backrest 27 relative to the pivot seats 31 along the length of the slots 2711 between locking and unlocking positions; a pair of retaining members 315, each of which is formed on a respective one of the pivot seats 31 and each of which is formed with a plurality of aligned retaining grooves 316; a pair of locking pins 34, each of which is secured to and projects outwardly from a respective one of the side tubes 271 into a selected one of the retaining grooves 316 in a respective one of the retaining members 315 when the backrest 27 is disposed at the locking position so as to prevent undesired pivoting movement of the backrest 27 relative to the pivot seats 31; and a pair of urging members 35 mounted respectively in the side tubes 271 and abutting respectively against the connecting pins 33 so as to accumulate a restoring force, which restores the backrest 27 from the unlocking position to the locking position, when the locking pins 34 are moved upwardly and outwardly of the selected ones of the retaining grooves 316. As such, the backrest 27 can be angularly adjusted relative to the pivot seats 31 (see FIG. 5, the arrow indicates the pivoting movement of the backrest 27). When the backrest 27 is disposed at the first angular position, the baby chassis carriage serves as a stroller frame, and the backrest 27 is inclined relative to the seat rods 26 at a desired angle that provides support for a baby's back. When it is desired to move the backrest 27 from the first angular position to the second angular position, the backrest is pulled upwardly to permit disengagement of the locking pins 34 from the selected ones of the retaining grooves 316 that retain the backrest 27 at the first angular position, and is subsequently moved frontwardly to the frontmost ones of the retaining grooves 316 so as to permit engagement of the locking pins 34 with the frontmost ones of the retaining grooves 316. Note that the urging members 35 are compressed upon pulling of the backrest 27 so as accumulate a restoring force that restores the backrest 27 to the locking position when the pulling action of the backrest 27 is relieved.

When the backrest 27 is moved to the second angular position and the locking position, the baby chassis carriage 100 is capable of supporting the baby's car seat 200 thereon as best shown in FIG. 1. The front retaining portion 8 of the baby's car seat 200 includes two opposite side hooks 81 that open downwardly, and a middle hook 82 that is disposed between the side hooks 81 and that opens upwardly. The side hooks 81 and the middle hook 82 engage the top end 272 of the backrest 27 when the baby's car seat 200 is supported on the baby carriage chassis 100.

With the inclusion of the supporting protrusions 922 in the baby carriage chassis of this invention, the aforesaid drawbacks associated with the prior art can be eliminated.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A baby carriage chassis adapted to support a baby's car seat thereon, the baby's car seat having front and rear retaining portions, said baby carriage chassis comprising:

a pair of opposing rear rods;

a pair of opposing front rods, each of which is disposed frontwardly of and is aligned with a respective one of said rear rods;

a pair of opposing seat rods, each of which interconnects an adjacent pair of said front and rear rods;

a pair of opposing supporting protrusions disposed above said seat rods and protruding transversely and respectively from said front rods in opposite directions; and a backrest pivoted to said seat rods so as to be pivotable relative to said seat rods between a first angular position, in which said backrest extends rearwardly and upwardly from said seat rods, and a second angular position, in which said backrest extends frontwardly and upwardly from said seat rods and intersects said front rods to define a V-shaped space for accommodating the baby's car seat therein and for permitting mounting of the front retaining portion of the baby's car seat on said backrest and mounting of the rear retaining portion of the baby's car seat on said supporting protrusions.

2. The baby carriage chassis of claim 1, wherein said backrest has a top end that is adapted to support the front retaining portion of the baby's car seat.

3. The baby carriage chassis of claim 1, further comprising a pair of opposing sleeves that are sleeved securely and respectively on said front rods, said supporting protrusions being fixed to and protruding respectively from said sleeves into said V-shaped space.

4. The baby carriage chassis of claim 1, further comprising a pair of pivot seats that are mounted respectively on said seat rods, said backrest being respectively pivoted to said pivot seats.

5. The baby carriage chassis of claim 4, wherein said backrest includes two opposing side tubes, each of which extends upwardly and inclinedly from a respective one of said pivot seats and each of which is formed with an elongated slot, said baby carriage chassis further comprising a backrest adjusting unit including: a pair of connecting pins, each of which extends through a respective one of said pivot seats and said slot in a respective one of said side tubes so as to permit pivoting of said backrest to said pivot seats and so as to permit movement of said backrest relative to said pivot seats along the length of said slots between locking and unlocking positions; a pair of retaining members, each of which is formed on a respective one of said pivot seats and each of which is formed with a plurality of aligned retaining grooves; a pair of locking pins, each of which is secured to and projects outwardly from a respective one of said side tubes into a selected one of said retaining grooves in a respective one of said retaining members when said backrest is disposed at said locking position so as to prevent undesired pivoting movement of said backrest relative to said pivot seats; and a pair of urging members mounted respectively in said side tubes and abutting respectively against said connecting pins so as to accumulate a restoring force, which restores said backrest from said unlocking position to said locking position, when said locking pins are moved upwardly and outwardly of the selected ones of said retaining grooves.

* * * * *